(12) United States Patent
Taillieu

(10) Patent No.: US 7,022,279 B2
(45) Date of Patent: Apr. 4, 2006

(54) METHOD AND INSTALLATION FOR APPLYING A RELIEF DECORATION TO ELONGATE MEMBERS

(75) Inventor: Guy Taillieu, Oudenburg (BE)

(73) Assignee: Orac N.V., Oostende (BE)

( * ) Notice: Subject to any disclaimer, the term of this patent is extended or adjusted under 35 U.S.C. 154(b) by 332 days.

(21) Appl. No.: 10/035,880

(22) Filed: Dec. 26, 2001

(65) Prior Publication Data

US 2003/0116875 A1 Jun. 26, 2003

(51) Int. Cl.
*B29C 47/78* (2006.01)
*B29C 55/18* (2006.01)

(52) U.S. Cl. ............... 264/493; 264/40.6; 264/211.12; 264/284; 264/320

(58) Field of Classification Search ............... 264/493, 264/40.1, 40.6, 210.1, 211.12, 280, 284, 293, 264/294, 296, 319, 320, 340, 345; 425/143, 425/169, 394
See application file for complete search history.

(56) References Cited

U.S. PATENT DOCUMENTS

| | | | | |
|---|---|---|---|---|
| 2,368,085 A * | 1/1945 | Barbieri | ...................... | 264/138 |
| 2,404,073 A * | 7/1946 | Karfiol et al. | ............... | 156/209 |
| 4,156,389 A * | 5/1979 | Sano et al. | ............... | 101/401.2 |
| 4,340,554 A * | 7/1982 | Bardwell | ................... | 264/40.7 |
| 4,379,102 A * | 4/1983 | Kertscher | ................... | 264/40.7 |
| 4,584,150 A * | 4/1986 | Ballocca | .................... | 264/40.1 |
| 4,883,690 A * | 11/1989 | Carter | ..................... | 427/430.1 |
| 4,911,629 A * | 3/1990 | Fujita | .......................... | 425/135 |
| 5,017,315 A * | 5/1991 | Kumazaki | .................. | 264/40.1 |
| 5,035,598 A * | 7/1991 | Fujita et al. | ................. | 425/144 |
| 5,135,688 A * | 8/1992 | Nakamura et al. | .......... | 264/40.6 |
| 5,149,472 A * | 9/1992 | Suganuma | .................. | 264/40.6 |
| 5,173,223 A * | 12/1992 | Kamiguchi et al. | ......... | 264/40.1 |
| 5,225,122 A * | 7/1993 | Inaba et al. | ................. | 264/40.1 |
| 5,395,565 A * | 3/1995 | Nagaoka et al. | ............ | 264/40.5 |
| 5,508,103 A * | 4/1996 | Cope | ........................ | 428/318.8 |
| 5,571,598 A * | 11/1996 | Butler et al. | ................. | 428/156 |
| 5,723,199 A * | 3/1998 | Boot | ........................... | 428/158 |
| 5,882,569 A * | 3/1999 | Maes | ........................... | 264/293 |
| 6,379,597 B1 * | 4/2002 | Brucker | .................... | 264/177.1 |
| 6,517,755 B1 * | 2/2003 | Okamoto et al. | ........... | 264/40.5 |

FOREIGN PATENT DOCUMENTS

| | | |
|---|---|---|
| EP | 0 731 759 B1 * | 8/1988 |
| EP | 0 723 845 A3 * | 1/1997 |
| EP | 0 852 997 A1 * | 7/1998 |
| EP | 0852997 A1 | 7/1998 |
| JP | 63055402 | 3/1988 |
| JP | 05318997 | 12/1993 |
| JP | 06037225 | 2/1994 |

* cited by examiner

*Primary Examiner*—Angela Ortiz
(74) *Attorney, Agent, or Firm*—Barnes & Thornburg

(57) ABSTRACT

The present invention relates to a method and installation for integrally applying a relief decoration to the surface of solid elongate members. The installation comprises a pre-heater (43) with pre-heater control means (69), a press (51), and a camber measurement system (67). The pre-heater (43) is adapted for differently heating the surface of two opposing faces of an elongate member previous to feeding it to the press (51) for applying the relief decoration. The camber measurement system (67) measures possible camber of the elongate member coming out of the press (51) and generates camber measurement signals which are fed back to the pre-heater control means (69) for controlling the heating of the pre-heater (43). The aim of the installation of the present invention is to eliminate the camber of following elongate members to which a relief decoration is to be applied.

8 Claims, 6 Drawing Sheets

METHOD AND INSTALLATION FOR APPLYING A RELIEF DECORATION TO ELONGATE MEMBERS

TECHNICAL FIELD OF THE INVENTION

The present invention relates to a method and installation for forming ornamented plastic articles. It has particular application to a method of forming an ornamental enhancement in relief integral with an extrusion profile and relates especially but not exclusively to manufacture of door, wall and window mouldings, coves, dado rails and picture frame members.

BACKGROUND OF THE INVENTION

As a result of the increasing cost of wood, there exists a demand for alternatives to solid wood construction products. Accordingly, the use of plastic extrusion profiles as substitutes for wood products in the areas of door, wall and window mouldings and picture frames has increased significantly in recent years. Plastic extrusion processes of materials such as polyurethane, polyvinylchloride (PVC) and polystyrene, for example, especially when foamed can provide a substitute for a wood picture frame or door, wall or window moulding.

Sometimes the plastics extrusion may also need to be decorated with ornamental features to enhance the beauty and desirability of the ultimate product. Various types of designs and patterns, such as for example flowers, leaves or scrolls, are used to cover and decorate the plastics extrusion profiles. Door panels for example may be provided with a decoration in relief.

Different techniques exist to apply a decoration to panels or extruded profiles. Existing materials and techniques of forming substantially rigid plastic articles, however, do not allow for efficient economical manufacture of products that have a decoration in relief.

One method consists of injection moulding, at low pressure, a composition of a certain material, preferably a foaming material. The mould presents the desired decoration pattern, and the injected material expands inside the mould. This method does not allow for low cost, large scale (high production rate) manufacture of sizeable ornamented plastic articles.

It is known from EP-0 731 759 to manufacture decorative panels with a decoration in relief by first heating up substantially homogeneously to a temperature at which the panel becomes soft. That way, all residual tensions previously present in the panel as a result of its extrusion are completely relaxed and a homogeneous, plastic mass is obtained. Then, with the help of a press and a mould, which is preferably brought to the same temperature as the soft foam panel, a decoration is applied. After pressing, the mould is left for a time in contact with the foam panel, while the latter is allowed to cool until it is substantially hardened again, after which the mould and the foam panel are separated from each other. This method has the disadvantage that substantially homogeneously heating a panel is very time-consuming. Depending on the material and the thickness of the panel, at least 20 minutes is needed to complete the whole operation.

A method of forming an ornamental or decorative enhancement integral with an extrusion profile is described in EP-0 723 845. The decorative enhancement is formed integrally with the profile by use of an embossment technique on the profile before the extrusion material sets and hardens. Therefore, a heated embossing wheel is driven over a portion of the profile to be decorated. The heat retained in the extrusion profile, as well as the heat in the embossing wheel, allows the formation of a decorative pattern in the profile. The decorative pattern is allowed to cure and harden along with the remainder of the profile. This method needs be carried out at a moment in time shortly after extrusion of the profile, when the profile is still hot. It cannot be done on profiles previously extruded and taken out of stock. An embossing roller is not able to emboss to the same depth as a moulding technique.

EP-0 852 997 describes a method of forming ornamented plastic articles, which comprises firstly extruding plastics material, and then re-moulding it in a hot stamp press. It has been found, according to this patent application, that by controlling the temperature of the press not only at the die above but also at the platen below the extruded profile, any tendency of the extruded profile to bow upwardly under the pressing action may be counteracted. Therefore, the ornamented plastic articles in principle should come out of the press straight. However, if environmental or materials parameters change, the conditions in the press need to be altered to restore product without camber. The die and plate of the press are large massive parts which have a high thermal capacity. Their temperature cannot be changed very quickly. Therefore, upon changing environmental parameters, a non-negligible amount of ornamented plastics profiles will be generated which have camber or production must be stopped until the press has reached equilibrium again. EP-0 852 997 mentions that the system cannot prevent surface damage and defects in the pressed product. No solution to this problem is proposed other than to accept the damage as an aesthetic effect.

SUMMARY OF THE INVENTION

It is an object of the present invention to provide a method and installation for forming ornamented plastic articles which overcome the disadvantages mentioned hereinabove. The above objective is accomplished by a method and an installation for integrally applying a relief decoration to a portion of the surface of solid elongate members of predetermined profile.

The method according to the present invention comprises the steps of preheating at least a portion of the surface of at least one face of an elongate member by means of a pre-heater located before a press for pressing in a decorative relief onto a surface of the elongate member. The surface of the face to be decorated in relief is heated more or less than other faces of the elongate member. Subsequently a relief decoration is applied to the surface of the elongate member by pressing the elongate member in a mould with a decoration. With negative relief is meant the inverse of the desired relief decoration. Thereafter, a structural defect or damage of the elongate member is measured, thus generating a defect measurement signal. These signals are fed back to a preheating controller which amends the settings of the pre-heater in response to or in accordance with the defect measurement signal, so as to eliminate or diminish the structural defect in subsequent elongate members to which a relief decoration is to be applied. The structural defect or damage may be, for example, an improper, deformed or incomplete relief, damage to the relief surface, e.g. crazing, or may be camber in the elongate member.

Preferably, after the pressing step the embossed elongate member is transferred to a calliper where it is cooled down and the degree of warp or camber or the degree of other defects measured only after it has reached a cooled (final) state. The calliper preferably is provided with adjustable holding means to adjust the shape of the elongate member during cooling in two mutually orthogonal directions which are perpendicular to the longitudinal axis of the elongate member. Cooling may be carried out by cool air jets or water jets.

An installation according to an embodiment of the present invention comprises a pre-heater with pre-heater control means, a press, separate from the pre-heater, for impressing a decoration into an elongate member as well as a defect or damage measurement system. The pre-heater is adapted for selectively heating at least a portion of one or more surfaces of an elongate member previous to feeding the elongate member into the press for applying the relief decoration by means of at least one mould cavity and/or mould plug. The defect measurement system may include measuring means to measure, for example, an improper, incomplete or deformed relief, damage to the relief surface such as crazing, or camber of the elongate element. A defect measurement system measures one or more defects such as camber of the elongate member coming out of the press and generates defect measurement signals. The defect measurement signals are fed back to the pre-heater control means for controlling the heating of the pre-heater. Upon reception of the defect measurement signals, the pre-heater control means decides which of the faces of the elongate member must be heated more or less in order to eliminate, or at least diminish, the defect, e.g. camber, of following elongate members to which a relief decoration is to be applied, and actuates the pre-heater accordingly. The decision may be taken for example based on a look-up table stored in a memory of the pre-heater control means. Preferably, the elongate member is cooled in a calliper before the camber measurements are made. The calliper preferably is provided with adjustable holding means to adjust the shape of the elongate member during cooling in two mutually orthogonal directions which are perpendicular to the longitudinal axis of the elongate member. Cooling may be carried out by air jets or water jets.

These and other characteristics and advantages of the invention may be seen from the following description of a specific embodiment of the method and installation for forming ornamented plastic articles according to the invention. This description is given for the sake of example only, without limiting the scope of the invention. The reference figures quoted below refer to the attached drawings.

In the different drawings, the same reference figures refer to the same or analogous elements.

DESCRIPTION OF THE ILLUSTRATIVE EMBODIMENTS

The present invention will be described with reference to certain drawings and embodiments but the present invention is limited only by the attached claims.

Figure 1:
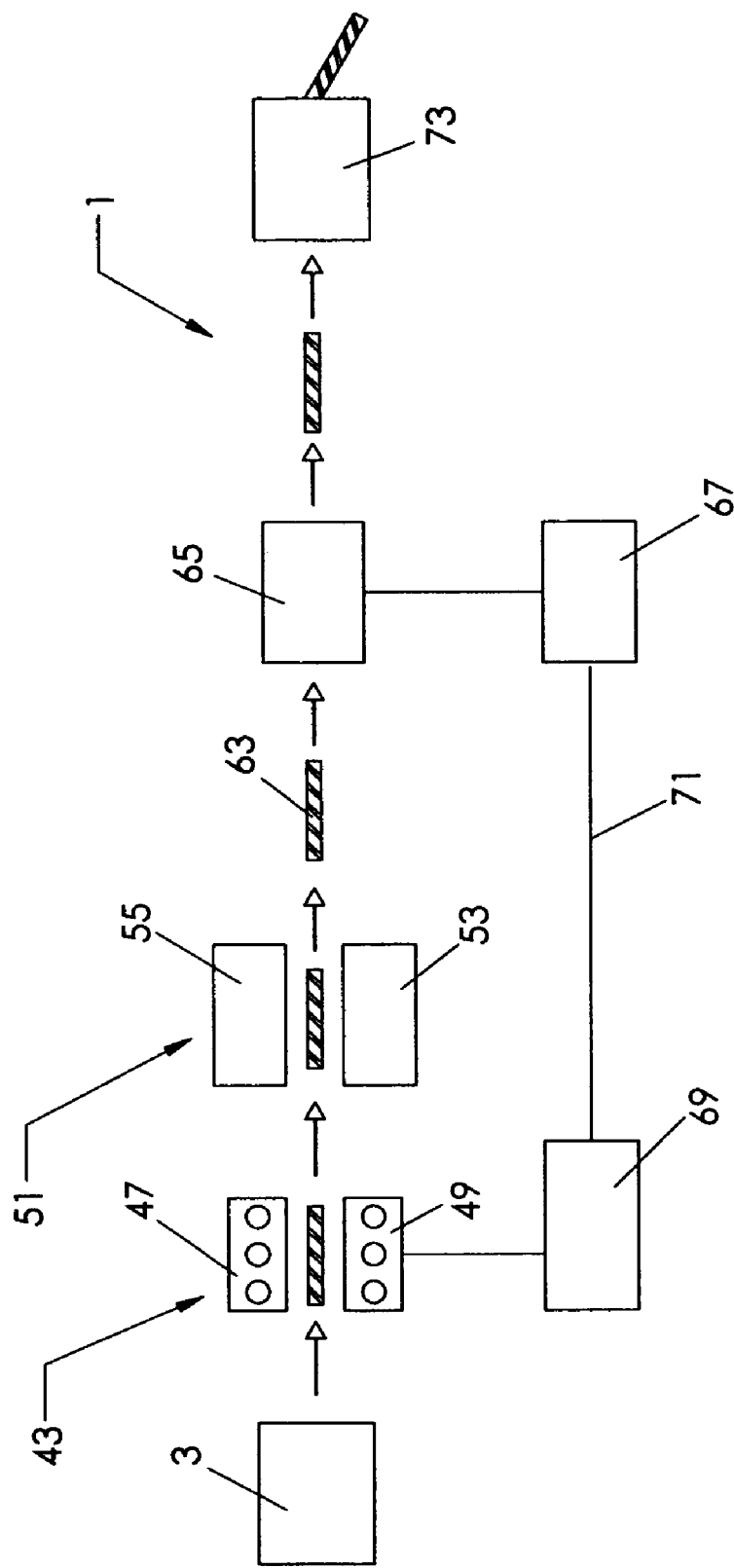
FIG. 1 is a block diagram illustrating the installation of the present invention.

As illustrated in FIG. 1, an embodiment of an installation 1 according to the present invention comprises firstly a supply 3 of elongate members. This supply 3 may either be from an extruder, from which a plastic material, such as a foamed plastic material is continuously extruded (in-line use) in the form of an extruded profile 7, or it may be a stock of previously extruded profiles 7 (off-line use). The extrusion profiles 7 may be door, wall or window mouldings, coves, dado rails, picture frame members or any other extruded object, even door panels for example.

The extrusion profiles 7 of the present invention may be made from any extrudable material. The preferred plastics materials for use in the invention include polyurethane, polyvinylchloride or polystyrene. Preferably the plastics material is extruded as a foam. Any other extrudable materials such as acrylonitrile-butadienestyrene (ABS) or similar materials may also be used. In addition to the above-mentioned materials, the extrusion profiles 7 may be formed from synthetic materials that contain for example PVC resins with minor amounts of additives, such as process aids, process modifiers, solid fillers and lubricants for the extrusion process, and/or curing compounds. Process aids and process modifiers are additives that adjust the extrudability properties and the physical properties (high strength and durability for example) of the extrusion profiles 7. An extrudable mixture is formed by combining all of the various ingredients with a high intensity mixer at an appropriate temperature.

Figure 2:
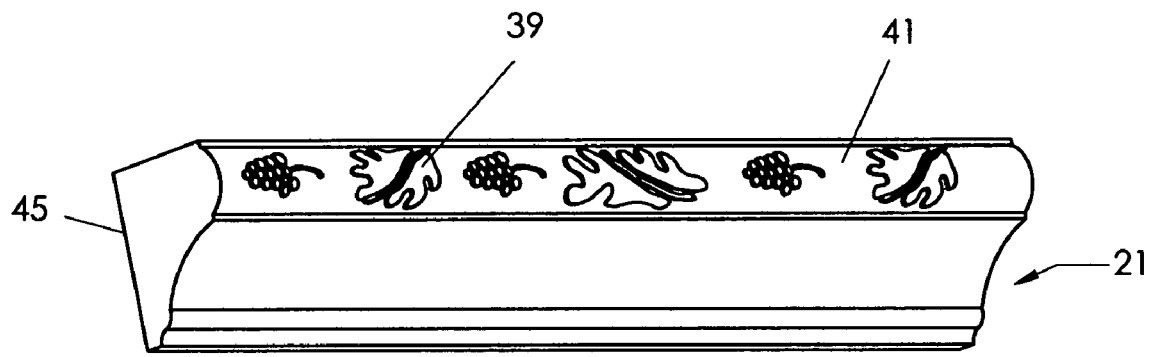
FIG. 2 is an extruded cove with a relief decoration.
Figure 3:
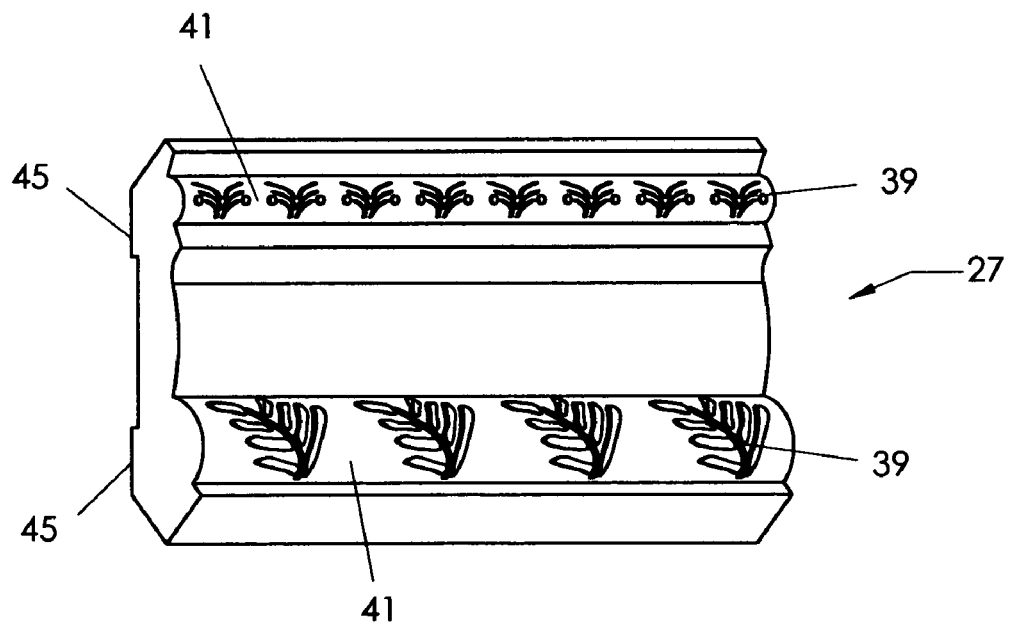
FIG. 3 is a wall-moulding with a relief decoration.
Figure 4:
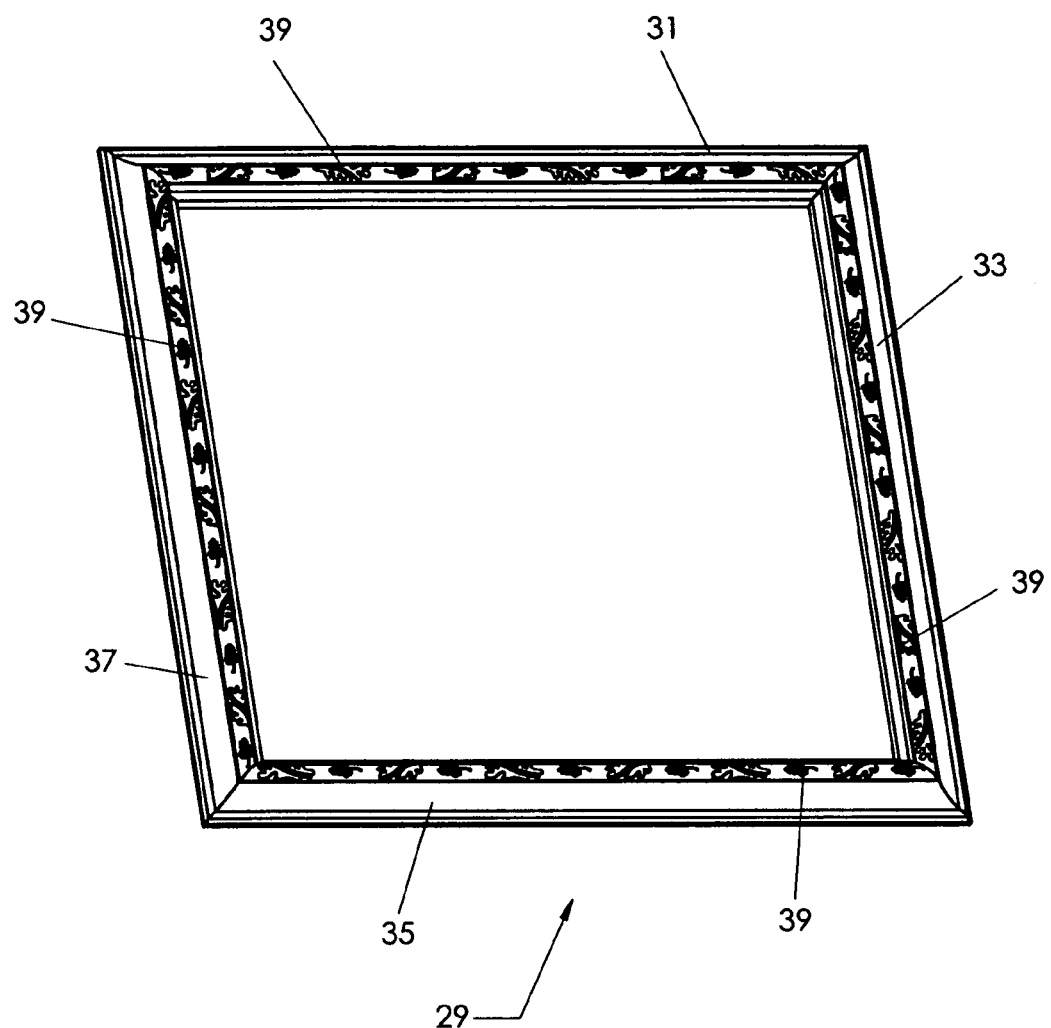
FIG. 4 is a picture frame consisting of four extruded picture frame members, each provided with a relief decoration.

While one example profile is shown in FIG. 2, many other profiles are contemplated within the scope of the present invention. An example of a wall moulding profile 27 is shown in FIG. 3. FIG. 4 represents a picture frame 29 consisting of four extruded profiles, the picture frame members 31, 33, 35, 37. The relief decoration 39 provides an ornamentation for the picture frame 29.

When thermoformable plastics are extruded, selected amounts of cross-machine and machine-direction orientation are generally built into the extrusion profiles 7 due to the extrusion process. When such an extrusion profile 7 is later heated to a critical temperature, it tends to shrink, thereby creating stresses if this shrinkage is resisted. It should be noted that the plastics material employed in the extrudable mixture 9 must be flexible enough to allow for stamping of the relatively intricate designs in relief without fracturing or cracking the extrusion profile 7 during the stamping or embossing process, yet rigid enough to retain the fine lines of the designs of the relief decoration 39 with as little warping of the extrusion profile 7 as possible.

In the example shown in FIG. 2, the extrusion profile 7 is destined to become a cove 21 and has a cross-section as represented in FIG. 3. Only one face of the extrusion profile 7, face 41, is to be ornamented with a relief decoration.

The extrusion profile is to be embossed in a press. Plastics materials embossed using a heated mould can show a variety of damage, deformity which will be called "defects". For example, the profile can be warped or have a pronounced camber on removal from the press. The process of indenting the relief into the surface of the material can result in a variety of problems, e.g. tearing of the material in the surface thus leaving rough patches or edges, crazing, an improperly formed relief, e.g. deformed or incomplete.

In accordance with the present invention these defects can be reduced or eliminated. Therefore, the extrusion profile 7 from the extrusion supply 3 enters a pre-heater 43, where it is selectively heated on at least a part of one face 41 by means of an first heater bank 47. It may be heated on more faces, e.g. at its lower face 45 by a lower bank 49 of convection or radiation heaters (e.g. infra-red radiation heaters). The upper face 41 of the extrusion profile 7 is the face where the relief decoration 39 has to be applied, and this upper face 41 may be selectively heated more or less than the lower face 45 as determined by a controller 69. Surprisingly it has been found that independent heating of the surface prior to hot moulding has an influence on many structural defects caused by the moulding process. The heater bank may be constructed so that it moves in and out of the press, i.e. the pre-heat is done in situ in the press. To prevent thermomechanical movement of the profiles 7 during the pre-heating stage, pins and/or guides may be provided in the press to hold the profiles 7 in position.

After the pre-heating step, the profile surface is moulded in a press 51 preferably a hydraulic press such as a hot stamp press having a lower platen 53 and an upper platen 55 with mould 57 configured to stamp the desired detail of the relief decoration 39 into the upper face 41 of the extrusion profile 7. Alternatively or additionally, a relief may be applied to the lower face 45 by using a mould on the bottom platen.

The mould 57 is provided with a negative image of the relief decoration 39 to be applied. The relief decoration 39 may be in "sunken relief" or in "raised relief". By "sunken relief" is meant a relief decoration in which the highest point is equal to the surface to which it is applied, while by "raised relief" is meant a relief decoration in which the decorations project outward from the surface to which they are applied. It is also possible to have a combination of these two types of relief, so that the decorations are partially sunken into the surface of the extrusion profile 7 and partly projecting outwards with respect to this surface.

The press 51 comprises a frame in which both the lower platen 53 and the upper platen 55 with mould 57 are mounted. Lower platen 53 and upper platen 55 can be moved up and down with respect to each other between a pressing position, in which the relief decoration 39 is pressed in the extrusion profile 7, and a rest position, in which the lower platen 53 and the upper platen 55 with mould 57 are at a certain distance from each other.

Figure 5A:
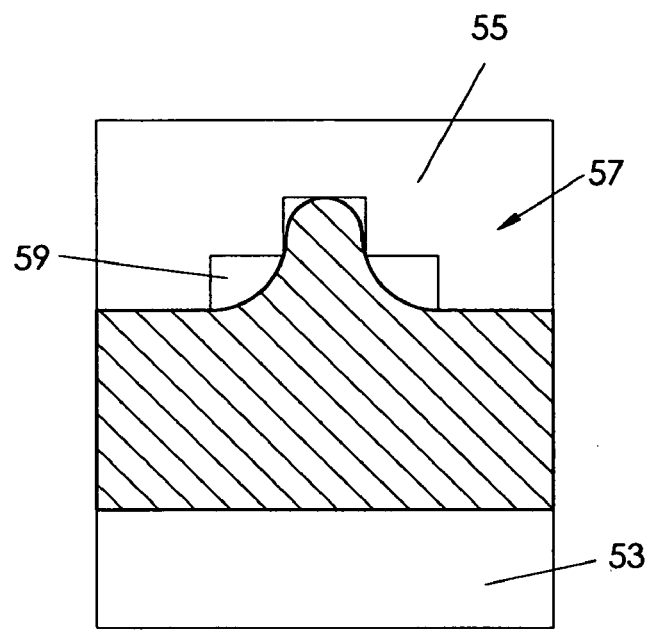
FIGS. 5A and 5B represent a platen and mould of a press, respectively for applying a raised and a sunken relief.
Figure 5B:
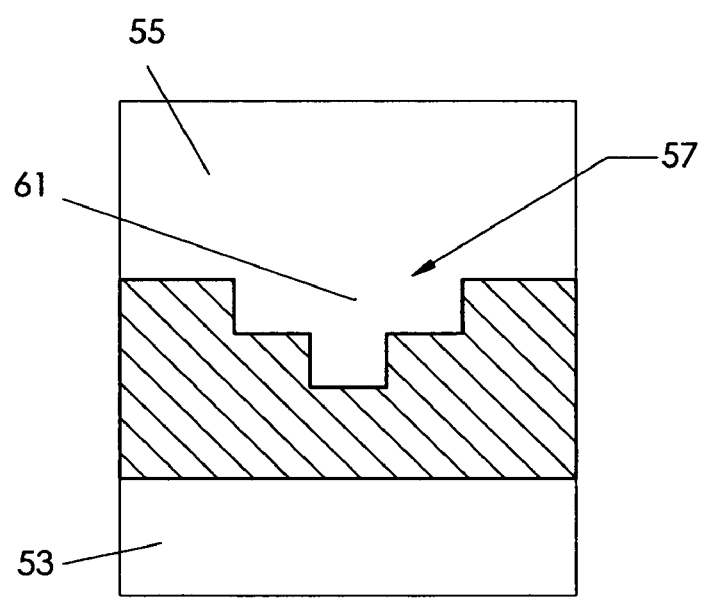

In order to obtain the desired relief decoration 39, the mould 57 is provided with mould cavities 59 (female) and/or mould plugs 61 (male), as represented in FIGS. 5A and 5B respectively. The mould plugs 61 may be decorations attached to the upper platen 55 by means of screws or adhesive. The decorations can for example consist of a cast iron or steel block. The mould cavities 59 can be milled out.

A press 51 of a meter or longer in length and suitably of the order of three meters in length is ideally provided to enable sizeable extrusion profiles 7 to be ornamented with a relief decoration 39 according to the present invention.

Preferably both the lower platen 53 and the upper platen 55 with mould 57 are heated, for example electrically under thermostatic control. The precise temperatures, pressures and compression times within the press 51 are selected to suit the nature of the extrusion profile 7 to be ornamented and the depth or height of the relief decoration 39. The required temperature, pressure and time are generally substantially lower than for corresponding injection moulding technique and, therefore, the energy input required is relatively low. Typically temperatures between 100° and 180° C. are used, and compression times are generally between 10 and 40 seconds with pressures of the order of, for example 5 to 10 bars per square centimeter. The press may be operated in such a way with a foamed material that the advancing portion of the mould locally heats the foam material to collapse the foam structure thus obtaining a relief pattern.

Figure 6B:
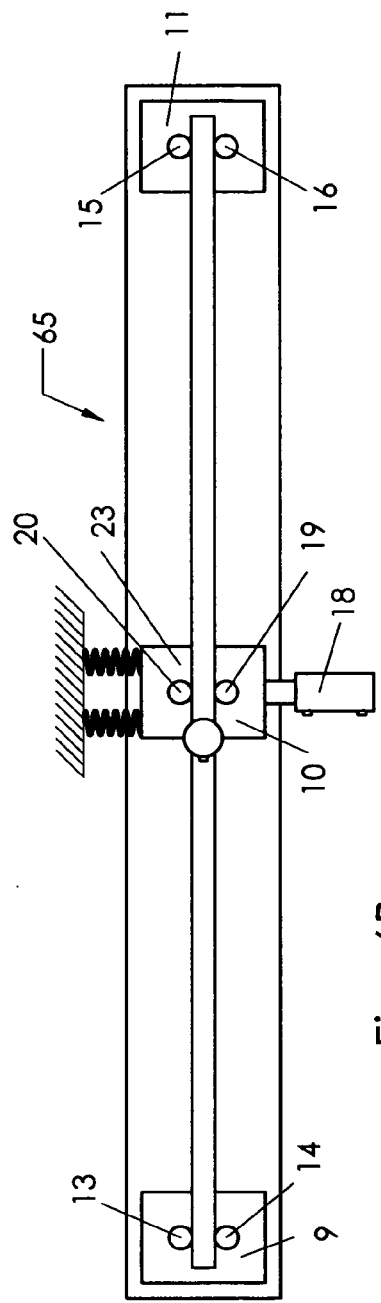
FIG. 6 is a perspective view of a calliper for use with the present invention.
FIGS. 6A and B show a side view and a top view of a calliper for use with the present invention.
Figure 6A:
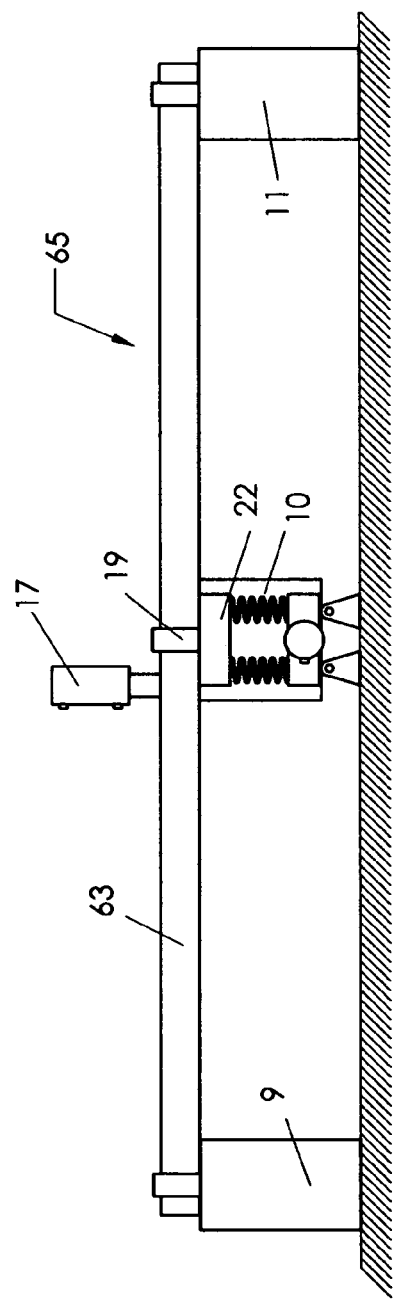
Figure 6:
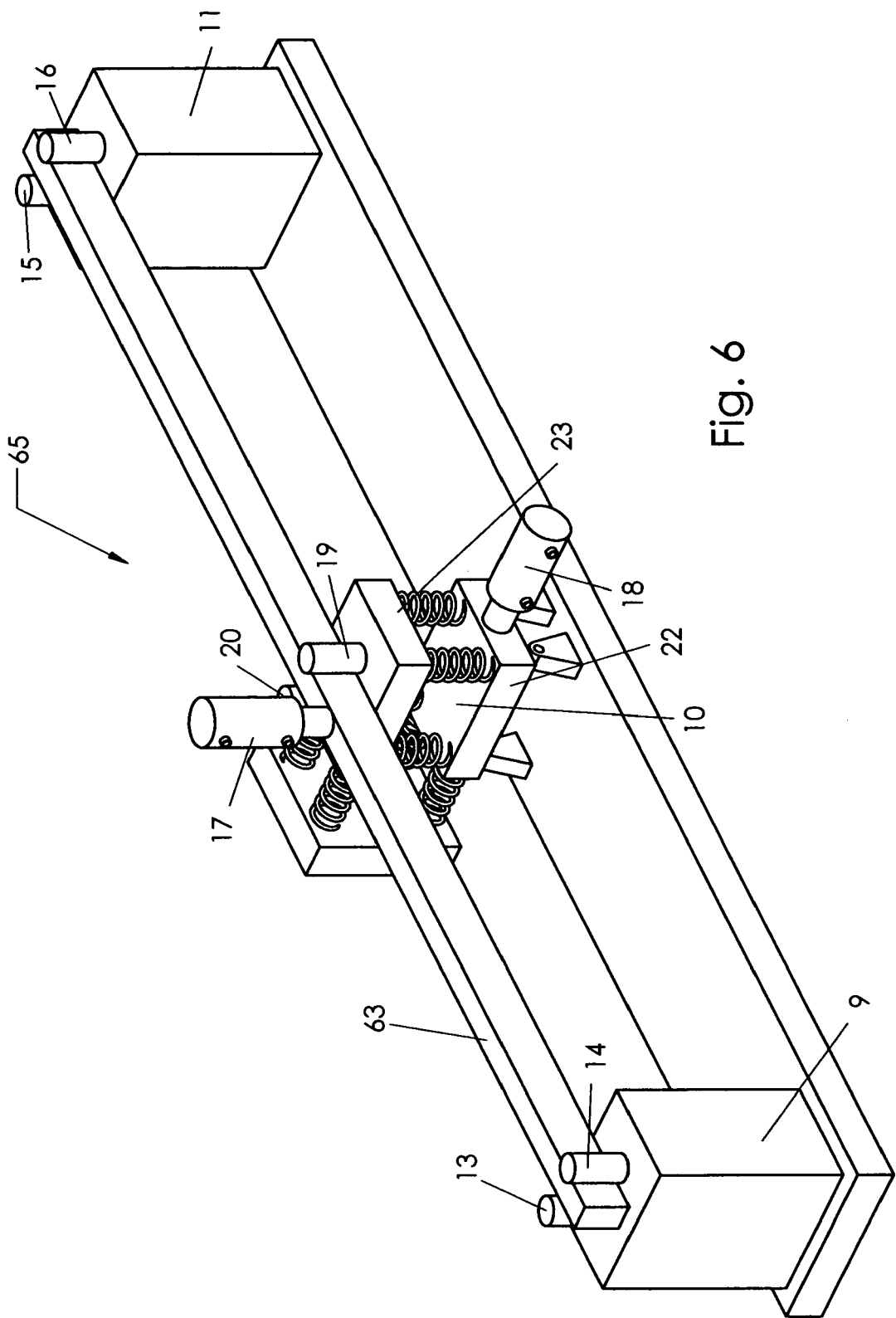

Preferably, the finished piece 63 is placed in a calliper 65 where it is cooled down in order to keep it straight. A calliper 65 is shown in FIGS. 6A and B. It comprises three stands 9, 10, 11. The outer stands 9, 11 include two movable fixtures, 13, 14, and 15, 16 respectively which support the elongate member 63 at its ends. The central stand 10 is provided with two movable and adjustable and mutually orthogonal positioners 17, 18 as well as vertical fixtures 19, 20. Opposite the positioners 17, 18 are sprung loaded plates 22, 23, respectively, which provide back pressure against the member 63. By means of the combination of these elements the member 63 is held in a specific pre-defined shape during cooling, e.g. in a straight line. Cooling jets of water or air or cooled air or water may assist in increasing the cooling speed (not shown).

After cooling down, a measurement system 67 measures defects in the product, e.g. crazing, incomplete or deformed relief pattern, a camber or warp of the finished cooled down piece 63. Camber may be measured by relaxing positioners 17, 18 and measuring the warp at the mid-position between stands 9 and 11 using suitable micrometers (not shown). At the same time the surface properties, e.g. defects, of the relief may be measured, e.g. the depth and completeness of the relief, surface roughness or crazing, etc. using suitable measurement means as known, per se, to the skilled person. The results of any one, some or all of these measurements are fed back as defect measurement signals.

If there is no camber or other defect, nothing has to change in the system. If however, the finished cooled down piece 63 displays a structural defect, e.g. is bowed upwards or downwards, and this camber is measured, or there are other defects, the temperatures of lower face 45 and/or upper face 41 of the extrusion profile 7 need to be changed, more particularly by the pre-heater 43. The defect error value, e.g. camber error, is automatically or manually entered into the controller 69. For example, the measurement system 67 generates a signal which is sent to a pre-heater controller 69 over a cable 71 or in any other way. The pre-heater controller 69 then actuates the pre-heater 43 accordingly, more specifically the upper bank 47 and/or lower bank 49 of heaters, in order to more or less heat the upper face 41 and/or lower face 45 of the extrusion profile 7 which enters the press 51. The pre-heater 43 being a convection or radiation heater, this change in heating by the pre-heater 43 can be carried out almost immediately, and the profile temperature changes equally rapidly.

Without being limited by theory it has been found surprisingly that an independent surface heating of an extruded profile can have beneficial results with respect to structural defects. It is thought that this is due to a different thermal gradient induced by pre-heating than is obtained by heating using the platens of a press.

The process is suitable for automation. In particular, the measurement of the defect such as camber or warp can be automated and the values fed back to the control device 69 automatically. The adjustment of the pre-heater bank or banks can then be carried out automatically. The measurement control system may contain a stored rule table or intelligent system which has been constructed based on previous experiments and experience.

Once the finished piece has been cooled down, a sectioning device 73 cuts the extrusion profile 7 into the desired lengths. In another embodiment of an installation according to the present invention, the extrusion profiles 7 are cut when they come out of the extrusion machine 5, and are only transported to the pre-heater 43 and the press 51 after being cut.

After the profile has cured and hardened, various finishes may be applied to it to enhance and highlight the embossed areas. The profile may be further decorated with hot stamps, stains and paints. The embossed and/or non-embossed areas may be painted, stained, glazed, brushed or clear coated.

In order to form the extrusion profiles 7 in an on-line installation while enabling substantially continuous extrusion, the extruder 5 or the pre-heater 43 and the press are suitably mounted on wheels or other transport means and are powered to move with the advancing extrusion until completion of pre-heating and pressing.

While the invention has been shown and described with reference to preferred embodiments, specific constructions and configurations, as well as materials, it will be understood by those skilled in the art that various changes or modifications in form and detail may be made without departing from the scope and spirit of this invention.

What is claimed is:

1. A method for integrally applying a relief decoration (39) to a portion of the surface of solid extruded elongate members (7) of predetermined profile, comprising the steps of
  a) pre-heating at least a portion of a first surface (41, 45) of an elongate member (7) by means of a pre-heater (43) having first heating means,
  b) applying a relief decoration (39) to a surface of the elongate member (7) by pressing in a heated mould (57) having second heating means in a press separate from the first heating means,
  c) measuring a structural defect of the elongate member (7) with applied relief decoration (39), thus generating deformity measurement signal, and
  d) controlling the step of pre-heating in response to the measurement signal so as to eliminate or diminish the structural defect in subsequent elongate members to which a relief decoration is applied.

2. The method according to claim 1, wherein the defect is a camber.

3. The method according to claim 1, wherein the defect is a surface defect in the relief decoration.

4. The method according to claim 3, wherein the defect is an incomplete or deformed relief.

5. The method according to claim 3, wherein the surface deformity is crazing.

6. The method according to claim 1, wherein the preheating step is by infra-red radiation or by convection heating.

7. The method according to claim 1, wherein the pre-heating step includes pre-heating a second surface of the elongate member.

8. The method according to claim 7, wherein the controlling step includes selectively controlling the heat energy applied to the first and/or second surface.

* * * * *